United States Patent [19]

Steiner

[11] 4,216,248

[45] Aug. 5, 1980

[54] 4-ALKOXY-5-(N,N-DIALKYLAMINO)-2-[(2,5-DICHLOROPHENYL)AZO]ACYLANILIDES

[75] Inventor: Russel I. Steiner, Reading, Pa.

[73] Assignee: Crompton & Knowles Corporation, New York, N.Y.

[21] Appl. No.: 911,121

[22] Filed: May 31, 1978

[51] Int. Cl.[2] ............... B41M 5/18; B41M 5/26; C09B 29/26

[52] U.S. Cl. ............... 427/148; 260/207; 427/146; 427/147; 428/323; 106/22; 106/23; 8/470

[58] Field of Search ............... 260/208, 207; 427/146, 427/147, 148; 428/323

[56] References Cited

U.S. PATENT DOCUMENTS

| 3,508,492 | 4/1970 | Seibert et al. | 427/148 X |
|---|---|---|---|
| 3,995,088 | 11/1976 | Garner et al. | 427/146 X |
| 4,011,352 | 3/1977 | Janssens et al. | 427/145 |
| 4,057,388 | 11/1977 | Defago et al. | 427/146 X |
| 4,119,622 | 10/1978 | Baumann et al. | 260/162 |

FOREIGN PATENT DOCUMENTS 2302201  9/1976  France ............... 427/148

*Primary Examiner*—Floyd D. Higel
*Attorney, Agent, or Firm*—William H. Elliott, Jr.

[57] ABSTRACT

This invention pertains to transfer sheets which comprise a flexible nontextile substrate in sheet, roll or web form having an all-over or discontinuous printed pattern effect thereon with the pattern being formed by a film of a dried ink formulation adapted for heat transfer printing of synthetic textiles in which the ink contains a red azo acylanilide of the formula

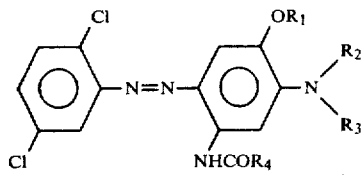

wherein $R_1$, $R_2$, $R_3$ and $R_4$, which are the same or different, are alkyl. These transfer sheets can be used for the heat transfer printing of synthetic textile fibers such as polyester textile fibers and nylon textile fibers.

3 Claims, No Drawings

4-ALKOXY-5-(N,N-DIALKYLAMINO)-2-[(2,5-DICHLOROPHENYL)AZO]ACYLANILIDES

This invention relates to transfer sheets that are adapted for use in heat transfer printing of polyester and nylon fabrics, to inks that are useful in making such transfer sheets, to an improved process using said transfer sheets for the heat transfer printing of polyester and nylon fabrics and to the printed or dyed fabrics produced thereby.

Various techniques (such as melt transfer and wet transfer) have heretofore been used to produce transfer prints but they have not been widely utilized in commercial fabric printing operations. In the late 1950's the French firm, Filatures Prouvost Masurel et Cie, pioneered the development of a dry transfer printing process, referred to variously as the vapor-phase process, the dry heat process or the sublimation process; the use of this process is in a stage of continuing rapid growth and it is described in great detail in published literature and patents—e.g., British Specification No. 1,189,026 discloses an early embodiment of the process.

In this application, the terms "thermal transfer process" and "heat transfer process" will be used interchangeably, and shall be construed as referring to the sublimation or vapor-phase process of printing or dyeing synthetic textiles wherein the textiles are colored with water-soluble dyestuffs that undergo sublimation at temperatures below that at which the physical integrity of the textile is impaired. The dyeing or printing is carried out by printing a substrate (usually paper or a sheet of non-textile material) in an all-over or discontinuous pattern with an ink that contains the sublimable dyestuff. The printed substrate and the textile to be dyed or printed are brought into contact under controlled conditions of time, temperature and pressure whereby the dye on the substrate is caused to sublime or be vaporized onto the surface of the textile to penetrate into the fibers and to be entrained therein. Thereafter, the substrate and the dyed or printed textile are separated.

Also, as used herein the following terms shall be deemed to have the following meanings:

(a) "Heat transfer prints" shall be construed as referring to solid or continuous (all over) printed pattern effects and also to discontinuous (localized) printed pattern effects produced by the heat transfer process.

(b) "Textile" shall be construed as referring to fabric (in web form or as piece goods), to nonwoven materials and to finished articles made from such products.

(c) "Polyester" shall be construed as referring to textiles made entirely or predominantly of polyester fibers.

(d) "Transfer sheet" shall be construed as referring to a non-textile substrate (normally, but not necessarily, paper) in sheet, roll or web form having an all over or discontinuous pattern effect printed thereon with a dried film of an ink formulation adapted for use in the heat transfer printing of synthetic textiles.

(e) "Compatible dyestuffs" and "compatible sublimable dyestuffs" shall be construed as meaning water insoluble disperse dyes or pigments or flourescent brightners that have essentially the same sublimability and thermal transfer characteristics, desirably they should be of about the same energy level and transfer at about the same rate under the same operating conditions.

A great many disperse dyes and pigments that are capable of coloring polyester fibers when applied by usual aqueous dispersion dyeing processes also possess some of the characteristics that are generally regarded as necessary in a dye that is to function effectively in the heat transfer process—i.e., water-insoluble dyes that are free of ionogenic groups (such as —COOH and —SO$_3$H) that inhibit sublimation that have a molecular weight of about 230 to 400, and that sublime at about 150° to 225° C.—preferably at 190° to 215° C.—(hereinafter such dyes are sometimes referred to as "sublimable dyes"). The dyes also should not migrate from the dyed textile to any appreciable degree at temperatures below about 125° C. so that the resulting transfer printed fabric can be pressed with a hot iron without "bleeding" (causing color migration). Since several layers of transfer sheets are frequently stacked in storage, it is desirable that the color printed on the transfer sheet should not migrate readily either through its own substrate or to the substrate of any superimposed contacting sheet material under storage conditions. Furthermore, dyes that volatilize at temperatures below about 150° C. have a tendency to vaporize too rapidly and do not produce sharply defined patterns because of flushing. Dyes that volatilize between 150° C. and 190° C. can be used but frequently they give rise to ring dyeing by superficially coloring only the outermost surface of the fiber. Dyes that volatilize at temperatures above about 225° C. tend to be unsatisfactory because such temperatures approach the 1st degree transition temperature at which most of the currently used synthetic fibers soften to a point where the fabric integrity is lost or its physicals are impaired. Further, the rate of volatilization should be such that optimum color transfer can be obtained within the contact time normally employed in the thermal transfer printing process i.e., without about 15 to 45 seconds and usually about 30 seconds.

Whether or not a particular dyestuff that appears to be possessed of the requisite volatility or sublimability needed for use in the heat transfer process has the other working and performance properties so that it can effectively be used for such purposes can only be determined empirically. A preliminary screening can be carried out by using a heating device of the type used to determine color fastness to dry heat (Test Method 117-1966T of the American Association of Textile Chemists and Colorists) and evaluating the color transference of the compound dye under various predetermined time, temperature and pressure conditions; a preliminary evaluation procedure is described in greater detail in Russell I. Steiner's application Ser. No. 821,730 filed Aug. 4, 1977. However, such screening is not always conclusive and in plant trials are usually needed before a final determination can be made whether a given compound can be effectively used in a particular application of the heat transfer process.

Moreover, no single sublimable disperse dyestuff of any hue possesses the combination of color characteristics, working properties and performance properties such that it has universal utility and can be effectively used in all types of thermal transfer printing applications. Selecting a heat transfer dye or dye combination involves a complex interplay of many factors; thus, its cost, its fastness properties, the strength and build-up characteristics on the particular fiber undergoing the printing or dyeing operation, its compatibility with other transfer dyes, its penetration characteristics, its migration properties, and its color utilization efficiency are all significant factors that, from the standpoint of commercial acceptability, have to be considered.

Color or hue is a most significant factor; if the dyestuff can not develop the particular hue and depth of color desired by the designer or stylist, the dyestuff simply will not sell even though it is a low cost dye and may have other outstanding properties.

The rate and extent to which the sublimed dyestuff will penetrate the fabric is another factor that determines whether and how a particular dyestuff can be utilized in a given type of heat transfer printing application. Thus, where the sublimed dye penetrates deeply and rapidly into the fibers, the dye cannot be used to produce sharp discontinuous or localized effects because feathering occurs at the edges of the pattern; such dyes however, if otherwise suitable, can be used to make heat transfer prints in solid colors on flat goods and on pile fabrics. On the other hand, sublimed dyes that are merely deposited on the surface and do not penetrate deeply into the fibers are unsuitable for use in the heat transfer of pile fabrics since only the tip-ends of the fiber will be colored; they are also unsuitable for transfer printing of flat goods where "grin through" (whitening or color change that becomes visible as the fabric weave is stretched or distorted) is to be avoided. Unfortunately, many of the sublimable dyestuffs that penetrate deeply and rapidly also have a tendency to "blow" through the fabric and considerable quantities of the dye are not retained by the fabric thus making for inefficient color utilization.

Thus, the type of pattern effect to be produced and the nature of the substrate will in many cases be a determining factor in dyestuff selection; dyes that are useful for printing sharp detailed patterns are unsatisfactory for printing all over effects, and vice versa. Some dyes are highly specific to a particular fiber type while others (relatively few in number) can be used on two or more different fiber types. In the so called general purpose applications, the degree of penetration is not an important aesthetic or performance consideration and some disperse dyes have utility as general purpose heat transfer dyes.

Still another factor that must be considered in selecting suitable disperse dyes for heat transfer printing is the dyes compatability under processing conditions with other transfer dyes of different hues and colors that are already commercially available so as to enable maximized use of the dye in producing compound colors.

The color strength developed at various concentrations, its build-up rate and its color utilization efficiency also exert an influence on the selection of compounds that are suitable for use in heat transfer printing. Desirably, the color should build-up at a substantially uniform rate (and over as wide as possible range of temperatures) so that it can be used to impart a wide variety of depths from pastel to masstones and exhibit good color strength at all depths. Moreover, and in order to minimize waste of expensive dyestuff, the maximum amount of color should be transferred from the paper to the fabric during the printing.

Furthermore, as is the case in all textile printing and dyeing procedures, the fastness of the color to light and wet treatments are highly important factors that must be considered and weighed against the intended end use requirements of the fabric or textile to be printed.

Of the many thousands of disperse dyes that are now known, only a very small percentage exhibit the unique combination of working and performance properties that have enabled them to achieve a significant degree of commercial acceptance as heat transfer colors. Thus, in the full palette of colors now available for use by heat transfer printers, there are less than 100 dyes that are regarded as being commercially significant and only about 10–15 of these are reds. The most often used reds are C.I. Disperse Red Nos. 4, 11, 60, and 65 and to a lesser extent, Red Nos. 1, 7, 13, 15, 55, 59, and 78. Although each of these red dyes possesses some beneficial and desirable properties, all tend to be of a blueish or pinkish hue and none can impart a bright neutral red coloration to either polyester or nylon fibers. Each of these dyes is also subject to one or more rather significant utility limiting shortcomings such as high cost and limited use for a single fiber type.

The dyestuff industry is constantly seeking to fill the gaps in the heat transfer printers palette by supplying colors that overcome the recognized deficiencies of the dyes that are presently commercially available. By this invention, I have discovered a very small group of relatively low cost red disperse dyestuffs that can impart a unique hue to both polyester and nylon and that at the same time have a balance of other working and performance properties that will enable this use for many general purpose heat transfer printing applications.

Specifically, the unique hue is a bright neutral red; and sharply contrasts with the much duller reds of the commercially used transfer reds—all of which also are considerably off neutral either on the yellow side or the blue side.

The compounds that impart this unique neutral red hue are the azo acylanilides of the formula

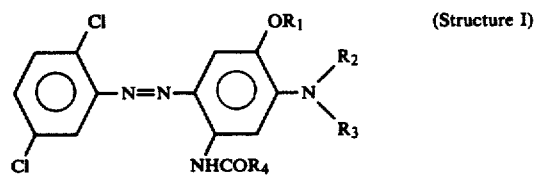

(Structure I)

wherein $R_1$, $R_2$, $R_3$ and $R_4$ are alkyl-preferably a lower alkyl of about one to four carbon atoms—and which may represent the same or different alkyl groups.

The Structure I azo acylanilides are made by diazotizing 2,5-dichloraniline and coupling the diazonium salt to a 3-(N,N-dialkylamino)-4-alkoxy-acylanilide. From the standpoint of economy of manufacture, and optimum working and performance properties, the preferred dye for use in accordance with this invention has the formula

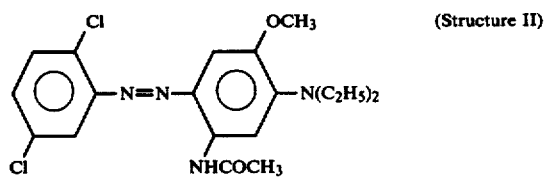

(Structure II)

The couplers that are suitable for making the other acylanilides for use in accordance with this invention include:

3-(N,N-dimethylamino)-4-methoxy acetanilide;
3-(N,N-diethylamino)-4-methoxy acetanilide;
3-(N,N-dipropylamino)-4-methoxy acetanilide;

3-(N,N-dibutylamino)-4-methoxy acetanilide;
3-(N-ethyl-N-methyl)-4-methoxy acetanilide;
3-(N-propyl-N-methyl)-4-methoxy acetanilide;
3-(N-butyl-N-methyl)-4-methoxy acetanilide;
3-(N-ethyl-N-propyl)-4-methoxy acetanilide;
3-(N-ethyl-N-butyl)-4-methoxy acetanilide; or
3-(N-propyl-N-butyl)-4-methoxy acetanilide.

One can also employ the -4-ethoxy, the -4-propoxy or the -4-butoxy derivatives of any of the foregoing compounds in lieu of the -4-methoxy compound. Instead of the foregoing -4-alkoxy acetanilides, one can also use the corresponding butyranilides, propionanilides or valeranilides.

U.S. Pat. No. 2,083,308 is concerned with a great many similar and related monoazo acylanilide compounds that can be used as water insoluble disperse dyes—especially for cellulose esters. The patent, however, is not concerned with the use of the dyes in heat transfer printing and many of the azo acylanilides of the patent are totally unsuitable for use in any type of heat transfer printing process because even relatively minor structural variations can significantly affect the suitability of any of these dyestuffs as effective heat transfer colors. For example, not all isomers of the Structure I compounds exhibit all of the properties that make the Structure I compounds useful as a heat transfer dyestuff. Transfer prints on polyester made with the 2,4—and 3,4—dichloro derivatives quite unexpectedly exhibit unsatisfactory light fastness and somewhat poorer resublimation than the 2,5-dichloro Structure I compound; this is in addition to the expected shade shifts.

The Structure II compound develops an outstanding bright neutral red shade of good strength on both polyester and nylon fibers. It is a far less expensive dye than the principal dyestuffs now available where a neutral red shade is a vital selection factor. The light fastness of the Structure II compound on polyester is on the low side but it is deemed commercially adequate for end uses where the printed fabric is not intended to be subjected to prolonged or severe sunlight. It shows good light fastness on nylon. It is a medium high energy heat transfer dye, exhibits good penetration on polyester under normal printing conditions and is useful in general purpose heat transfer printing applications. It is not satisfactory as a transfer dye for acrylic fibers. It is compatible with a large number of the transfer dyes of other colors now regularly used by heat transfer printers.

In use in the thermal transfer process, the dye is dispersed in an ink base formulation including a vehicle (of either the aqueous or solvent type) and a film-forming binder adapted to the type of printing operation to be used in printing the transfer sheet—i.e., gravure, flexographic, lithographic offset or rotary screen—and printed on the substrate—usually a paper sheet or web. The problems incident to paper selection and to the manufacture and formulation of ink bases (including the selection of appropriate vehicles, solvents, binders, thinners, etc. used to make the ink base) that are suitable for use in the printing of the heat transfer substrates by the various printing techniques are all well understood in the art and no special or unique problems arise by virtue of the use of the specified azo acylanilide dyes in such formulation.

The dyes in the ink formulation used in producing the substrate should preferably be free of dispersants and ground to a particle size that can be readily dispersed in the vehicle—preferably less than 3 microns in size. When used in ink systems with other compatible sublimable dyes or optical brighteners, they, too, should preferably be dispersant free and have the same order of particle size as the specified azo acylanilide dye component.

The following examples will serve to illustrate the preparation of the Structure I compounds and use of the compounds in accordance with this invention. In these examples, unless otherwise indicated, parts are by weight, temperatures are given in degrees Centigrade and percentages are by weight.

EXAMPLE 1

100 ml of 32% HCl was diluted with 250 ml water and heated to 75° C. 32.4 g. 2,5-dichloraniline were added to the HCl solution and the temperature raised to 95° C. to completely dissolve the dichloraniline. The hot dichloraniline solution and 53 ml of 4 N sodium nitrate were simultaneously added to 250 ml of cold water containing 2.5 g. sodium nitrate. The temperature was held at 0° C. by adding ice during the addition; 5 g. of Filter-cel was added and the solution filtered to remove insolubles. The thus formed diazo was divided into two equal parts, and to one part, there was slowly added a solution of 24 g. 3-(N,N-diethylamino)-4-methoxy acetanilide in 100 ml glacial acetic acid. The addition was completed in 40 minutes and the temperature held at 0° C. during the addition. The pH was raised to 4 by the addition of 100 ml 25% NaOH solution while holding the temperature below 5° C. The mass was stirred overnight and thereafter the red precipitate was recovered by filtration and dried. The yield was 38.8 g. of a dry red powder with a m.p. of 112°-115° C. and having Structure II. It can be used to impart a bright neutral red hue to polyester fibers and to polyamide fibers by the heat transfer process.

EXAMPLE 2

(a) A gravure ink with a viscosity of 22 seconds on a #2 Zahn cup, was made by blending 20 parts of the red compound of Example 1 with 80 parts of an ink base (composed of 8 parts ethyl cellulose as the binder and 72 parts of a vehicle (80% by weight ethanol and 20% by weight toluol) and grinding the ingredients in a shot mill to a particle size under 3 microns.

(b) To make the transfer sheet, the resulting ink was diluted to give a 4% dye concentration and printed on a standard gravure base paper stock using a Geiger laboratory gravure proofing press with an engraved cylinder at 150 cells/linear inch. The printed transfer sheet was allowed to dry.

(c) An undyed piece of 100% texturized polyester fabric was placed on the printed face of the dried transfer sheet. The composite was positioned between two platens with the unprinted side of the transfer sheet in contact with the heated surface of the platen and was under conventional heat transfer operating pressure and heated for 30 seconds at 205° C. Thereafter the fabric and used transfer sheet were separated. The polyester fabric was dyed on its face in a hue of good tinctorial strength and good wet fastness properties and good color penetration.

All fastness tests were conducted in accordance with AATCC Standard Test Methods as follows:

Light Fastness—Xenon-AATCC Test Method 16E-1971 and Fade-O-Meter—AATCC Test Method 16A-1971.

Wash Fastness—Test #2A—AATCC Test Method 61-1972.

Sublimation Test—AATCC Test Method 117-1973.

Perspiration—Test specimens were evaluated for resistance to acids by AATCC Test Method 15-1973.

Crocking—AATCC Test Method 8-1972.

Ozone fading—AATCC Test Method 109-1975.

The results are tabulated in Table 1 below. The table gives numerical values to the tests described above, using the usual AATCC numerical ratings running from 5 to 1; in which 5 represents no or negligible change, 4 represents a slight change, 3 represents a noticeable change and 1 represents much change.

TABLE 1

| Light Fade-O-Meter | (3 at 40 Hours) | |
|---|---|---|
| | #2A Wash | Perspiration Acid |
| Alteration | 4 | 4–5 |
| Staining | | |
| Acetate | 5 | 5 |
| Cotton | 5 | 5 |
| Nylon | 4 | 5 |
| Polyester | 5 | 5 |
| Wool | 5 | 5 |
| Orlon | 5 | 5 |
| Crock Test | | |
| Wet | 5 | |
| Dry | 4 | |

TABLE 1-continued

| | Example 1 |
|---|---|
| Sublimation | |
| 340°/30″ | 3–4 |
| 385°/15″ | 3 |
| Gas fade-2 cycles | 4–5 |
| Ozone fade-2 cycles | 5 |

I claim:

1. A transfer sheet comprising a flexible nontextile substrate in sheet, roll or web form having an all-over or discontinuous printed pattern effect thereon, said pattern being formed by a film of a dried ink formulation adapted for heat transfer printing of synthetic textiles and wherein the ink film contains an azo acylanilide of the formula:

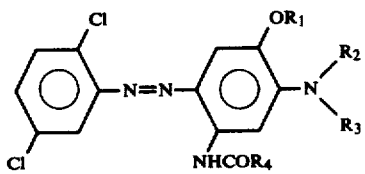

wherein $R_1$, $R_2$, $R_3$ and $R_4$ are alkyl and are the same or different.

2. A transfer sheet according to claim 1 wherein $R_1$, $R_2$, $R_3$ and $R_4$ are lower alkyl.

3. A transfer sheet according to claim 1 wherein $R_1$ is methyl, $R_2$ and $R_3$ are ethyl and $R_4$ is methyl.

* * * * *